United States Patent
Fall et al.

(10) Patent No.: US 8,239,534 B1
(45) Date of Patent: Aug. 7, 2012

(54) PRECEDENCE ADJUSTED RESOURCE ALLOCATION

(75) Inventors: Thomas C. Fall, Los Gatos, CA (US); Roger P. Chase, Columbus, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 1303 days.

(21) Appl. No.: 10/619,025

(22) Filed: Jul. 14, 2003

(51) Int. Cl.
  *G06F 15/16* (2006.01)
(52) U.S. Cl. ........ 709/226; 709/240; 709/238; 709/235; 709/227; 709/231; 370/235; 370/232; 370/230; 370/229; 370/468
(58) Field of Classification Search .................. 709/226, 709/231, 338, 224, 238; 705/11, 400; 370/229–231
  See application file for complete search history.

(56) References Cited

U.S. PATENT DOCUMENTS

| | | | | |
|---|---|---|---|---|
| 6,141,322 A * | 10/2000 | Poretsky | ........................ | 370/231 |
| 6,910,024 B2 * | 6/2005 | Krishnamurthy et al. | .... | 705/400 |
| 7,085,236 B2 * | 8/2006 | Oldak et al. | ................ | 370/235.1 |
| 2002/0150158 A1 * | 10/2002 | Wu et al. | ................... | 375/240.12 |
| 2003/0067941 A1 * | 4/2003 | Fall | ................ | 370/468 |

* cited by examiner

*Primary Examiner* — Jude Jean Gilles

(57) ABSTRACT

Methods that perform message and real-time data and computational flow routing across networks comprised elements with a dynamic time-varying network topology and loading. The unique algorithms and protocols for allocation of network resources embodied in the present methods provide optimal performance for high precedence traffic while providing as good as possible performance for lower precedence traffic.

12 Claims, 5 Drawing Sheets

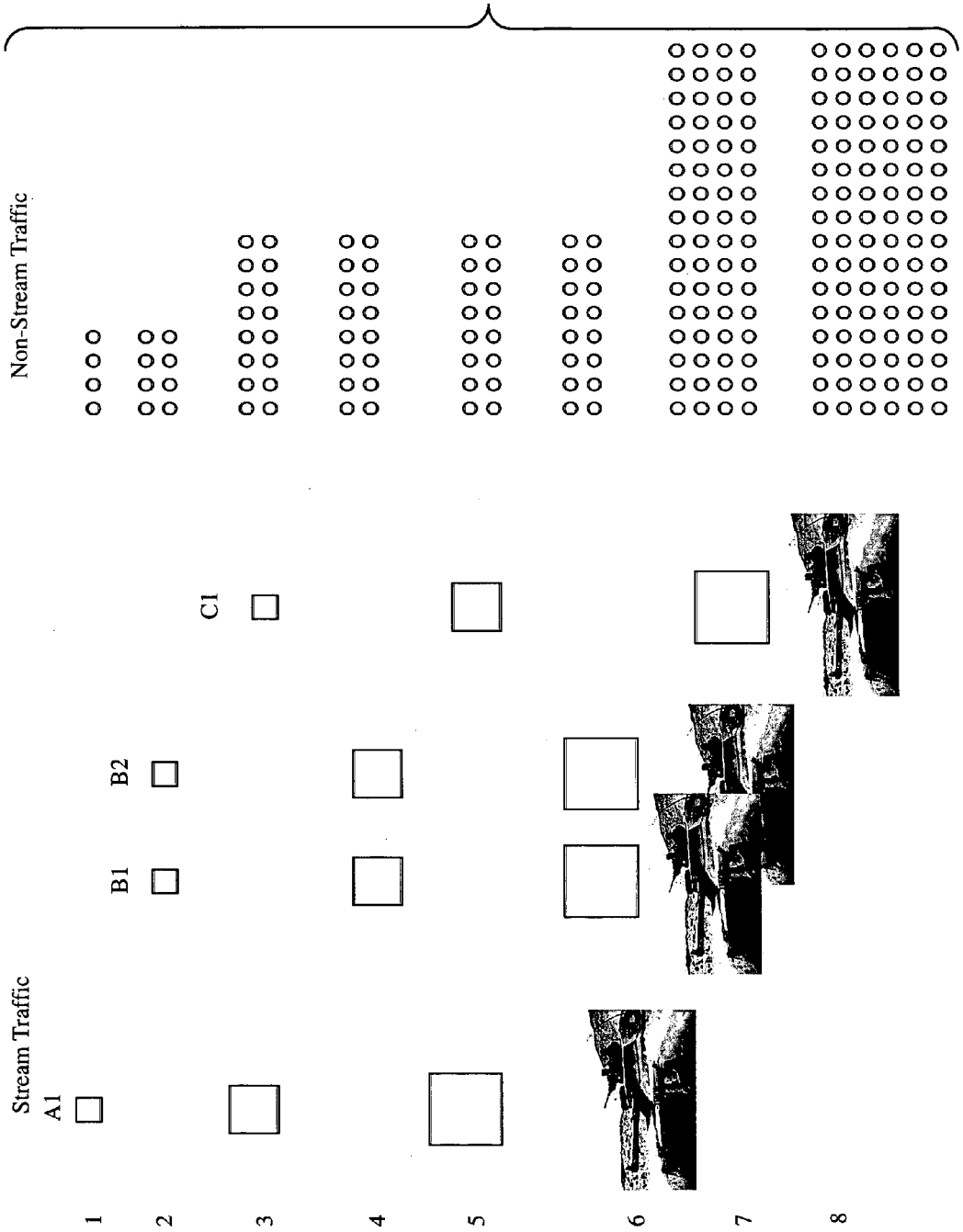

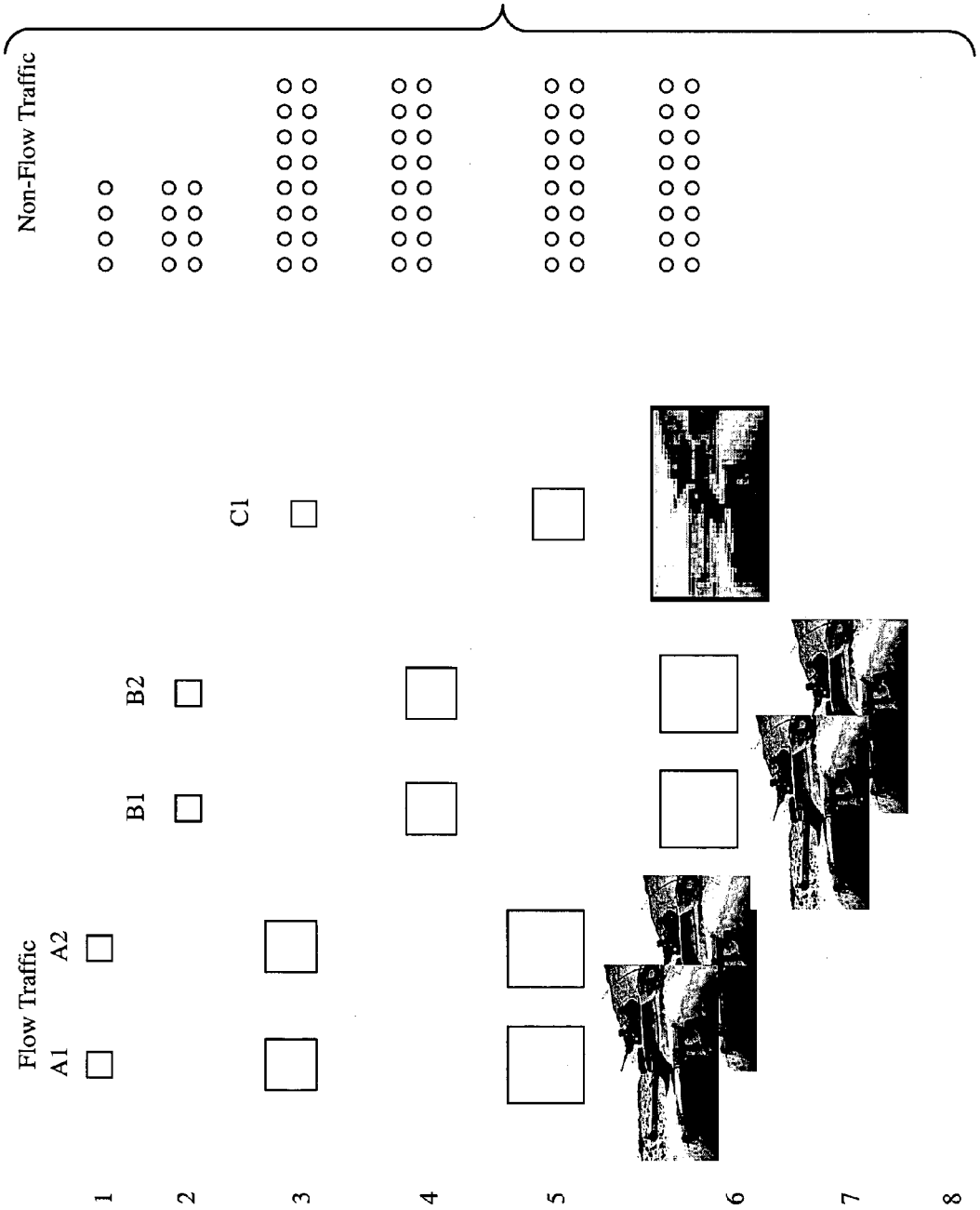

PRECEDENCE ADJUSTED RESOURCE ALLOCATION

BACKGROUND

The present invention relates generally to dynamic networks of communications and computational resources, and more particularly, to methods that provide precedence adjusted resource allocation in such dynamic networks.

There is a different community of prior art related to each of these networks, communications managers and computational resource managers. The present invention is unique in both of these application communities.

Communication network and computational system performance can be dynamic for two reasons: topology changes and congestion/contention. The topology changes due to failure/creation of links or failure/creation of nodes. A link may be destroyed because of fade due to distance change or media becoming more opaque; a computational node may find that its battery is running dangerously low and removes itself from the network. Both of these affect the topology of the network that can in turn affect the network's performance. The other cause of performance degradation is congestion. Here, throughput for a particular communication stream or computational application can be temporarily decreased by demands from other sources. Whether dynamic changes are due to topology or to congestion, the network cannot guarantee continuous, full throughput to all users. Not everyone will be able to get complete satisfaction, who does? And how does the system determine who does get complete, partial, or minimal service?

Prior art of the communications community, when bandwidth gets temporarily decreased on a link or through a node, will completely drop some connections, forcing them to switch to a backup path, and if one had not been set up, the connection will be completely interrupted until a new path was found. Although methods of the prior art can usually discover alternate paths through the network to route around link faults, users will still experience abrupt disconnects lasting for varying lengths of time. In addition, the decision mechanisms that controls who will get the congested resources are either very expensive (i.e., require a lot of bandwidth and computation) or provide unpredictable overall network performance. This problem is especially serious for high priority applications such as military battlefield communications or emergency networks in disaster areas where there are some applications that require particular support.

Prior art of the computation community that addresses this situation relate to "active networks" research efforts. These use communication protocols to load balance the network of communication and computational resources by factoring in computational costs at the nodes into the communication link cost formulas used by the routing protocol; for instance, the Open Shortest Path First (OSPF) protocol uses a sum of link costs to determine shortest paths and now the computational node costs would be added in. (See Ralph Keller, et al., "Active Pipes: Service Composition for Programmable Networks", Proceedings 2001 Milcom) Though this approach provides much more flexibility than the standard load sharing techniques, because it relies on the communication protocols, it suffers the faults those have, in particular non-graceful degradation of service and no prioritization of service.

There is an additional community somewhat between these two, referred to as the multimedia delivery community. They have prior art that uses a layered approach for communications in combination, with a computational approach for reconstructing the original streams. (See Lidia Yamamoto and Guy Leduc, "An Active Layered Multicast Adaptation Protocol" Second International Working Conference on Active Networks (1WAN 2000), Tokyo Japan, October 2000) For instance, the Active Layered Multicast Adaptation Protocol (ALMA) splits a multimedia stream into a hierarchy of flows so that "best possible" multicast can be achieved. In this method, a multicast application is a single source and multiple receivers and produces hierarchically layered traffic. Each layer is packetized separately into capsules that also contain instructions as to how to process it an intermediate active nodes. These nodes compare the cost of the outbound link with the budget the capsule carries to determine whether to transmit the capsule or discard it. The hierarchical layering is such that the lower layers stand by themselves but higher layers need the lower layers. Thus, lower layer capsules have a higher budget and tend to make it through, whereas the higher level is most prone to discard if there is congestion.

This methodology clearly has the advantage that there is graceful degradation of service as opposed to the all-or-nothing service of the other two prior art areas. However, this community is focused pretty narrowly on the multicast delivery of multimedia services and thus issues of managing the multicast tree are prominent in their literature. They are not looking at the management of mixed traffic networks where there is connectionless and connection oriented. Also, the management functions are initiated at the edges (the source or the receiver) and thus cannot be responsive to local contexts.

It is therefore an objective of the present invention to provide for methods that provide for precedence adjusted resource allocation in dynamic networks that provide optimal service with respect to local contexts for the most necessary traffic while still providing as good as possible for the other traffic.

SUMMARY OF THE INVENTION

The present invention performs message and real-time data flow traffic management across networks comprised of nodes with a dynamic time-varying network topology and/or dynamically changing traffic loading. The unique algorithms and protocols for allocation of network resources embodied in the present invention provide optimal performance for high precedence traffic while providing as good as possible performance for lower precedence traffic.

The present invention decomposes a data flow into separate layered streams, each carrying additional increments of resolution. As an example, a video teleconference data flow is commonly encoded according to an MPEG-2 standard, which can decompose the picture information into substreams via JPEG type discrete cosine transform layers. A low bandwidth stream can carry low resolution, low bandwidth core transmission, say 16×16 pixels. Each pixel is given values that indicate the average chrominance and luminance over the area of the pixel. For the next higher layer, 32×32 pixels, each 16×16 pixel is quartered and the smaller pixels, instead of carrying the average over its surface, instead carries the delta between that average and the average of the parent pixel. This is done because typically the dynamic range of the delta to the previous average is less than the raw dynamic range, so the bits can be mapped so as to carry more information per bit. Therefore, the higher bandwidth streams can carry high bandwidth details and build on the lower layers. Also, they are typically larger bandwidth. For example, FIG. 3 shows two JPEG levels of resolution of the same image. The one is at low resolution and is 1 KB in size; the higher resolution, with three times better acuity, is 10 KB in size.

This scheme allows sub-streams to be transmitted on different channels, to be separately received and decoded, and finally recombined to produce a complete picture with full detail. If the channel bandwidth is degraded, the streams carrying the details (which are much larger than the core signal) are dropped with the result that the perceived quality drops (i.e., the image may become more grainy) but there is at least some amount of communication passed. A coarse grained, but still intelligible, level of detail of the picture comes through, so that, though a viewer's experience of the picture is degraded, useful information is continuously conveyed. When full connectivity is restored, the data flow is available once again at the output of the receiver, and the viewer sees a picture having increased video quality. Thus, instead of the all or nothing-at-all options of the prior art, the user always gets communication, just sometimes at a lower quality.

The decomposition scheme may be applied to audio streams, as well, and provides the benefit that users at opposite ends of a variable quality link can communicate continuously, provided a minimum amount of useable bandwidth remains. For a computational flow over multiple processors that can be hierarchically layered, then the present method applies to it as well.

The present method thus combines a multi-stream encoding concept with multi-level precedence and is evaluated at each intermediate node. The result is a unique method of optimum resource allocation for dynamic networks that is cognizant of local context.

The present invention provides robust performance that degrades gracefully when the bandwidth required by a traffic flow is diminished due to congestion or network reconfiguration. This is a very lightweight distributed resource allocation algorithm that allocates network resources more efficiently and effectively than methods in the prior art. Network users will experience longer periods of continuous, although occasionally degraded connectivity when this new method is employed. It is generally well known that this sort of graceful degradation is preferable to communication over a link that alternates between all and nothing. Further, more important applications can be given priority so that they achieve the performance that they need.

The present invention assigns a hierarchy of precedence levels to each set of sub-streams that result from the decomposition of each data flow. Then the method uses a unique precedence arbitration algorithm to achieve highly efficient use of the network resources.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 4 and 5 pictorially illustrate an exemplary precedence adjusted resource allocation method in accordance with the principles of the present invention and what its impact is on various flows.

DETAILED DESCRIPTION

Figure 1:
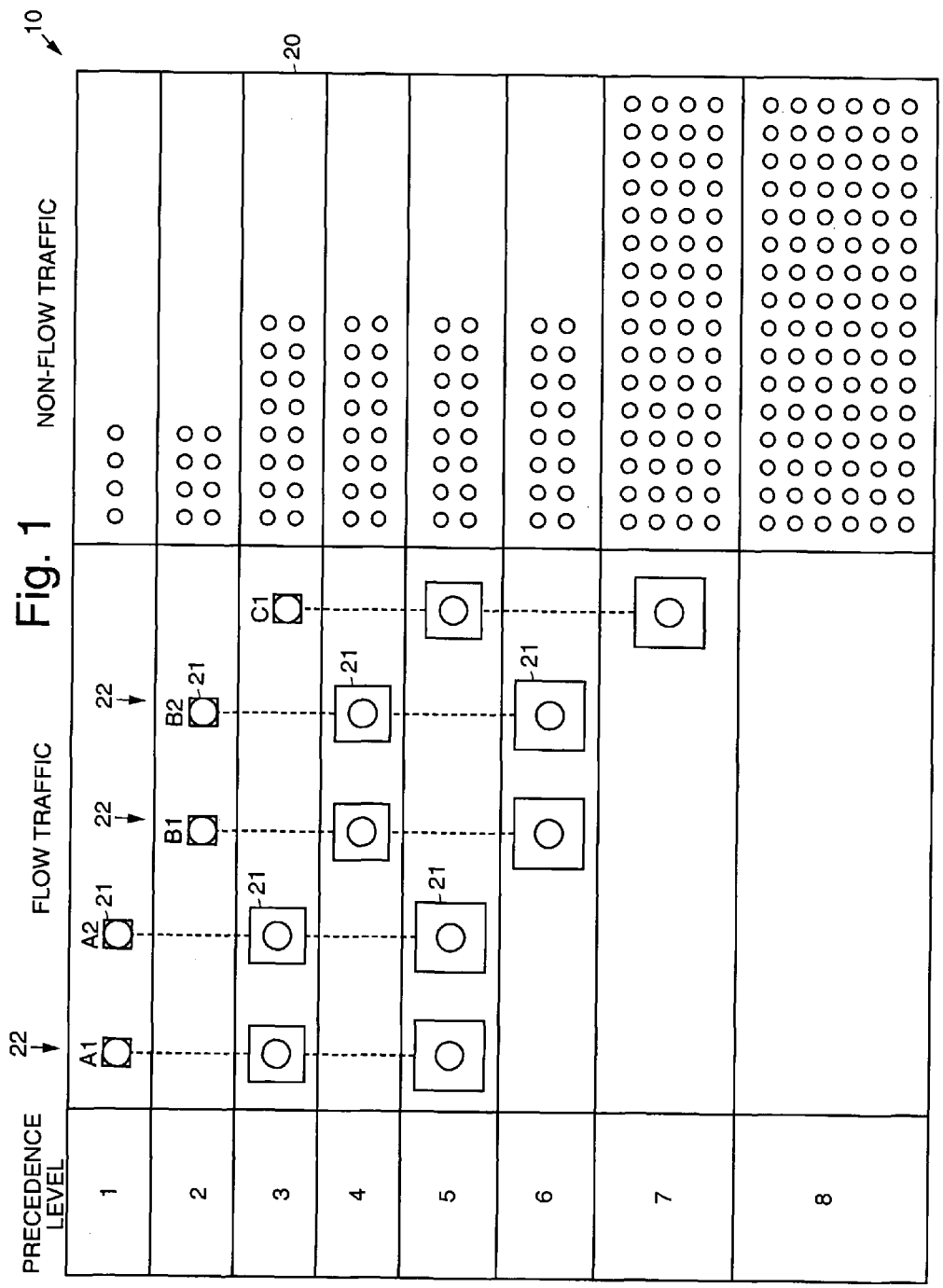
FIG. 1 pictorially illustrates an exemplary precedence adjusted resource allocation method in accordance with the principles of the present invention.

Referring to the drawing figures, FIG. 1 pictorially illustrates an exemplary precedence adjusted resource allocation method 10 in accordance with the principles of the present invention. FIG. 1 shows five data flows 22 at a node of a network 20 along with precedence level and non-flow traffic, all competing for a resource (whether an outbound link or a computational resource). Each data flow 22 on the network 20 is divided at its source into several sub-streams 21, such that each substream 21 carries some amount useful information on its own, and such that the original data flow can be reconstructed at its destination from the separate streams without loss of information.

More particularly, FIG. 1 shows five data flows 22, each represented by a set of squares joined by a vertical dashed line. The squares represent the sub-streams 21 of the flow's decomposition, and the area of each square represents the relative bandwidth of the corresponding sub-stream 21. The position of the squares on the vertical axes represents the precedence level assigned to each sub-stream 21. These precedence levels form a decreasing hierarchy with the highest precedence at the top of FIG. 1. The highest precedence sub-stream uses the smallest bandwidth, and it contains the most essential information contained in its parent data flow 22.

A key feature of the present invention is the overlap on the precedence scale of the sets of sub-streams 21 belonging to different data flows 22. This means that an essential sub-stream 21 (core transmission) of a lower precedence user's data flow 22 will trump the lower precedence sub-stream 21 of a high precedence user's data flow 22. This assures that when bandwidth is scarce, the essential sub-streams 21 of every data flow 22 are transported, while the quality of the picture representation or voice quality (reproduced from the data in the sub-streams 21) degrades gradually.

Figure 3:
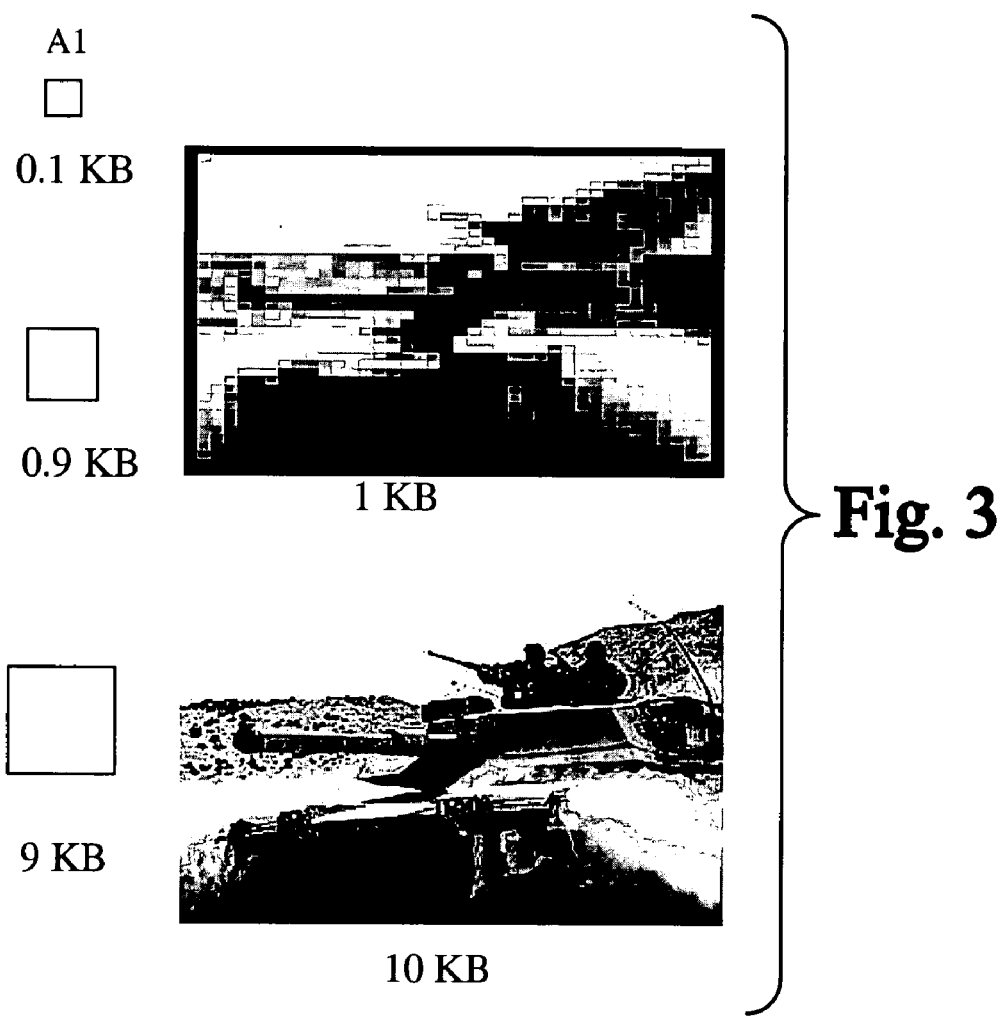
FIG. 3 pictorially illustrates how a video stream might be layered.

The precedence of each user and user's sub-streams 21 is determined by a network management policy. Software agents (not shown) at each node keep current data on characteristics and precedence of each data flow 22 and sub-stream 21. The agents arbitrate bandwidth contention based on precedence. FIGS. 3-5 show how this mechanism provides continuous service, though perhaps with graceful degradation. This will be discussed in more detail below.

The small dots at the right of the FIG. 1 represent connectionless flows of datagrams through the network 20. For a given precedence level, they are served after the flow oriented packets of that precedence level, but before the flow oriented packets of the next lowest level. They represent "best effort" traffic that depends on unused bandwidth at whatever precedence level for their successful transport. The datagrams are delayed, preempted or dropped when bandwidth is insufficient to transport that precedence level.

Figure 2:
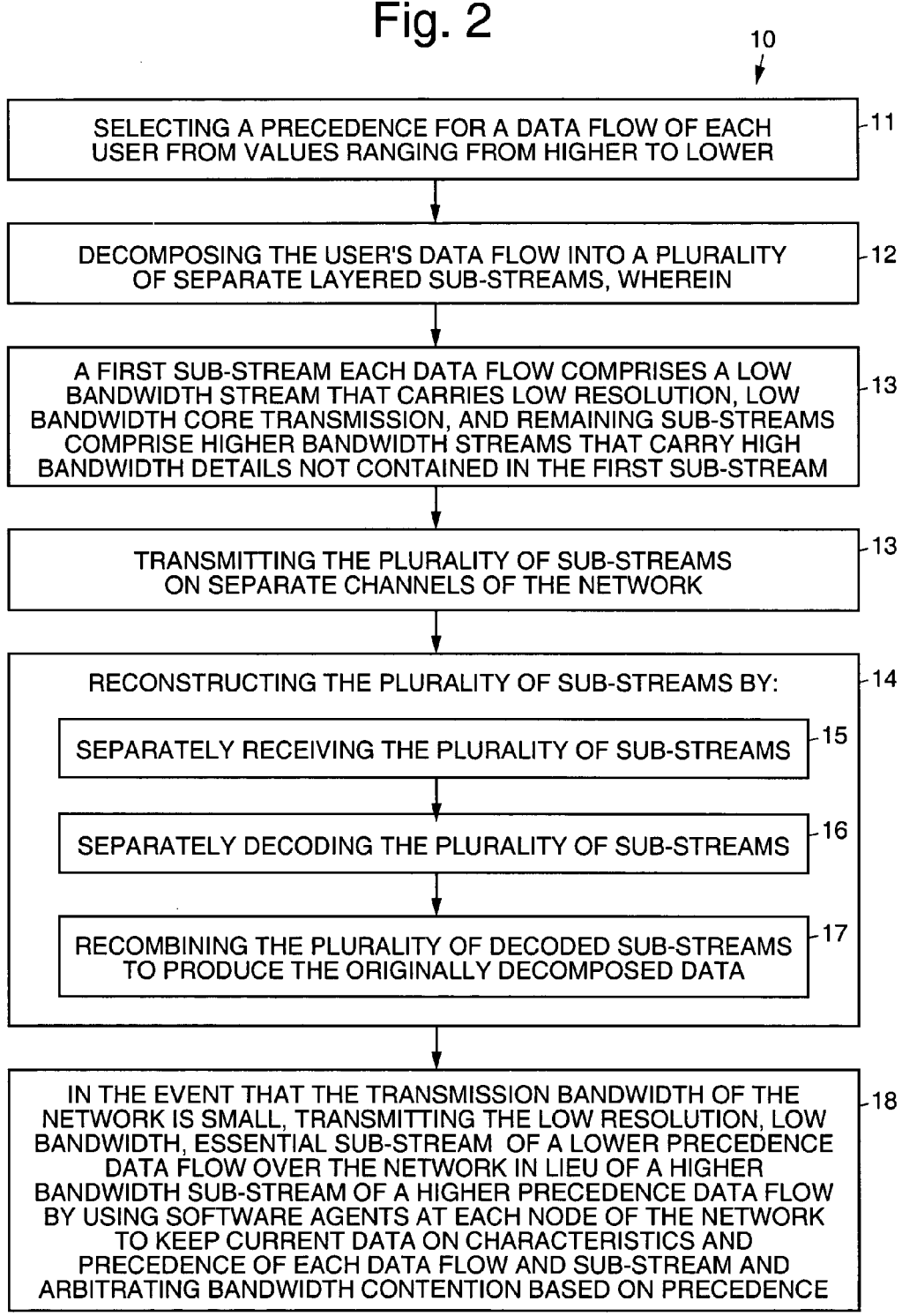
FIG. 2 is a flow diagram that illustrates an exemplary precedence adjusted resource allocation method.

FIG. 2 is a flow diagram that illustrates an exemplary precedence adjusted resource allocation method 10 in accordance with the principles of the present invention that is used in a wireless ad hoc network 20. The exemplary method 10 comprises the following steps.

A precedence for a data flow 22 of each user is selected 11 from values ranging from higher to lower. The user's data flow 22 is decomposed 12 into a plurality of separate layered sub-streams. A first sub-stream 21 of each data flow 22 comprises a low bandwidth stream that carries low resolution, low bandwidth core transmission. The remainder of the plurality of sub-streams comprise higher bandwidth streams that carry high bandwidth details not contained in the first substream.

The plurality of sub-streams are transmitted 13 on separate channels of the network 20. The plurality of sub-streams are then reconstructed 14. To reconstruct the plurality of sub-streams, they are separately received 15. Each of the plurality of received sub-streams is separately decoded 16. The plurality of decoded sub-streams are recombined 17 to produce the originally decomposed data.

In the event that the transmission bandwidth of the network 20 is small, the low resolution, low bandwidth, essential sub-stream 21 of a lower precedence data flow 22 is transmitted 13 over the network 20 in lieu of a higher bandwidth substream 21 of a higher precedence data flow 22. To accomplish this, software agents at each node of the network 20 keep current data on characteristics and precedence of each data flow 22 and sub-stream 21, and arbitrate 18 bandwidth contention based on precedence.

Referring to FIG. 3, it pictorially illustrates hierarchical layering of an application. This example shows how a video steam might be hierarchically layered. Going from highest priority layer on top down to lowest. On the left, there are squares whose area is proportional to the bandwidth at that layer. To the right is a visual image that could be computed based on that layer summed with the all the higher priority layers. The highest layer uses very little bandwidth but by itself it can't carry a visual image. This might be textual information such as timestamp, dynamic range, or geo coordinates of a sensor, for example. The next layer adds in information that lets us recover a low-resolution image, as seen to its right. This image of a Centurion tank is actually a JPEG image whose file size is 1 KB. The next layer adds on 9 KB, as seen in the square on the left, and on the right we see the sum of all the streams in a JPEG image of the Centurion tank that is 10 KB.

FIG. 4 shows how several streams (each of the columns on the left side represent a stream) are layered as well as the non-stream packets on the right. For example, the streams might be feeds from unmanned aerial vehicles (UAV) doing surveillance in front of and around an advancing column. The stream on the furthest left, A1, is the highest precedence. It comes from a UAV flying in front of the lead elements of the column. It has three substreams: a core which is at the highest priority level, 1; a larger substream carrying the next layer of detail and is at lower priority, level 3 and finally the largest substream, carrying the rest of the detail is at priority level 5. As in FIG. 3, the size of the square indicates the amount of bandwidth in the sub stream. There are two streams, B1 and B2, which are from UAVs on the flanks of the lead elements, and so are at lower precedence; their substreams are at priority levels 2, 4 and 6 respectively. The lowest precedence stream, CI, is from a UAV towards the rear of the column and its substreams are at priority levels 3, 5, and 7 respectively. At the bottom of each column is a photo indicating the quality delivered.

On the right side of FIG. 4 is the non-stream traffic. In this combat communications scenario, this might consist of status messages—what the position of an element is, what its effectiveness is, and so forth. These status messages are amalgamated at various levels to give status of overall units. A unit with one vehicle with somewhat degraded mobility, but the rest OK would rate its effectiveness at 95%. Precedence would be given to summaries of large units on the attack, then to both smaller units on the attack and large units supporting the attack. As we go down the precedence stack, we might see status reports for an individual weapon system on a forward attacking vehicle at the same precedence as a summary for a Company size element that is towards the rear.

In FIG. 5, an additional high precedence stream has been added and we see the consequences for the other traffic. The lead elements o the column have entered a particularly dangerous area, so an additional UAV has been assigned to help scout in front of the leading elements. Thus, its stream, A2, also has the highest precedence. However, adding this high precedence stream requires bandwidth at priority levels 1, 3 and 5 and this usurps the bandwidth that had been allocated to priority levels 7 and 8. Stream C1 loses its detail layer at priority level 7, causing its throughput image to become coarser. However, there is still a coherent stream being throughput, just at a lower quality, and the photo at the bottom of the C2 column shows that.

These figures depict how a node decides what to transmit out on a channel and within a military context. This channel may be a wireline channel, or it may be a wireless channel, either point-to-point or omnidirectional. The figures could as well represent a non-military node, for example, a wireless PDA might be serving as a relay in an ad hoc wireless network that connects into wire-line access points. Here, precedence might be based on what rates the relayed callers are willing to pay. They may also apply to distributed processing networks where the applications are layered; for instance a data fusion application where the layering corresponds to the degree of detail being computed.

Thus, methods that provide for precedence adjusted resource allocation in wireless ad hoc networks, dynamic networks and distributed processing networks have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A precedence adjusted resource allocation method for use with a network, comprising the steps of:
   selecting a maximum precedence for a data flow of a node from values ranging from higher to lower;
   for each data flow from the node that is separated into a plurality of layered sub-streams, respectively assigning a low resolution, low bandwidth data with the maximum precedence to one of the layered sub-streams, and assigning successively lower precedence to higher bandwidth data not contained in the low resolution, low bandwidth data to remaining layered sub-streams; and
   in the event that a transmission bandwidth at the node is small, transmitting only higher precedence layers over the network and dropping higher detail, lower precedence layers in lieu of dropping the data flow altogether, wherein the higher precedence layers include lower resolution, lower bandwidth, essential sub-streams of the data flow.

2. The precedence adjusted resource allocation method recited in claim 1 further comprising the step of assigning a precedence to non-flow traffic that is transmitted in preference to lower precedence traffic, both flow and non-flow.

3. The precedence adjusted resource allocation method recited in claim 1 wherein the network comprises a wireless ad hoc network.

4. The precedence adjusted resource allocation method recited in claim 1 wherein the network comprises a dynamic network.

5. The precedence adjusted resource allocation method recited in claim 1 wherein the network comprises a distributed computation network.

6. A precedence adjusted resource allocation method for use with a network, comprising the steps of:
- selecting a maximum precedence for a data flow of a node from values ranging from higher to lower;
- for each data flow from the node that is separated into a plurality of layered sub-streams, respectively assigning a low resolution, low bandwidth data with the maximum precedence to one of the layered sub-streams, and assigning successively lower precedence to higher bandwidth data not contained in the low resolution, low bandwidth data to remaining layered sub-streams; and
- in the event that a transmission bandwidth at the node is small, transmitting only higher precedence layers over the network and dropping higher detail, lower precedence layers in lieu of dropping the data flow altogether,
- wherein software agents at each node of the network keep current data on characteristics and precedence of each data flow and sub-stream, and arbitrate bandwidth contention based on precedence.

7. The precedence adjusted resource allocation method recited in claim 1 wherein the data flow includes an audio stream.

8. The precedence adjusted resource allocation method recited in claim 1 wherein the dataflow includes a video teleconference data flow.

9. The precedence adjusted resource allocation method recited in claim 1 wherein the data the data flow includes an image data flow.

10. A precedence adjusted resource allocation method for use with a network, comprising the steps of:
- selecting a maximum precedence for a data flow of a node from values ranging from higher to lower;
- for each data flow from the node that is separated into a plurality of layered sub-streams, respectively assigning a low resolution, low bandwidth data with the maximum precedence to one of the layered sub-streams, and assigning successively lower precedence to higher bandwidth data not contained in the low resolution, low bandwidth data to remaining layered sub-streams; and
- in the event that a transmission bandwidth at the node is small, transmitting only higher precedence layers over the network and dropping higher detail, lower precedence layers in lieu of dropping the data flow altogether,
- wherein each sub-stream contains information such that the data flow may be reconstructed from the remaining sub-streams.

11. A precedence adjusted resource allocation method for use with a network, comprising the steps of:
- selecting a maximum precedence for a data flow of a node from values ranging from higher to lower;
- for each data flow from the node that is separated into a plurality of layered sub-streams, respectively assigning a low resolution, low bandwidth data with the maximum precedence to one of the layered sub-streams, and assigning successively lower precedence to higher bandwidth data not contained in the low resolution, low bandwidth data to remaining layered sub-streams; and
- in the event that a transmission bandwidth at the node is small, transmitting only higher precedence layers over the network and dropping higher detail, lower precedence layers in lieu of dropping the data flow altogether,
- wherein a higher precedence sub-stream of the data flow is transmitted before a lower precedence sub-stream of another data flow with a higher precedence than that of the data flow.

12. The precedence adjusted resource allocation method recited in Claim 1 wherein the sub-streams are transmitted on separate channels of the network.

* * * * *